Sept. 10, 1968

E. J. SMOOT 3,401,372

TRAFFIC CONTROL SIGNALS

Filed Oct. 22, 1965

INVENTOR.
EDGAR J. SMOOT
BY
ATTORNEY

Sept. 10, 1968

E. J. SMOOT 3,401,372

TRAFFIC CONTROL SIGNALS

Filed Oct. 22, 1965

INVENTOR.
EDGAR J. SMOOT
BY
ATTORNEY

Sept. 10, 1968   E. J. SMOOT   3,401,372
TRAFFIC CONTROL SIGNALS
Filed Oct. 22, 1965   7 Sheets-Sheet 4
RED TO GREEN SEQUENCE
FACE "A" AND FACE "B"
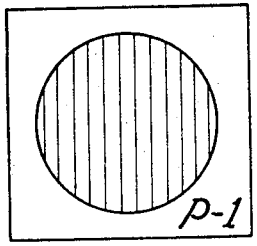
ALL SECTORS ARE RED
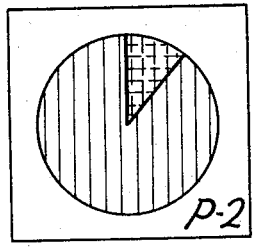
SEC. NO. 1 TURNS AMBER
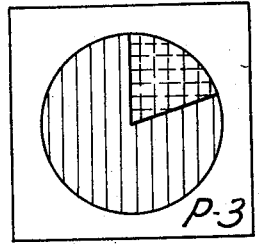
SEC. NO. 2 TURNS AMBER
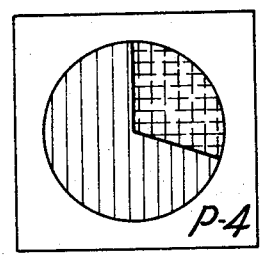
SEC. NO. 3 TURNS AMBER
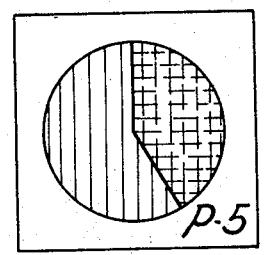
SEC. NO. 4 TURNS AMBER
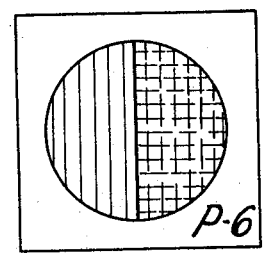
SEC. NO. 5 TURNS AMBER
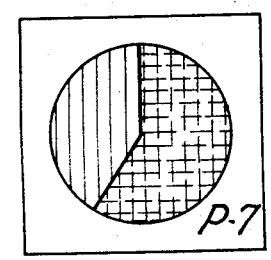
SEC. NO. 6 TURNS AMBER
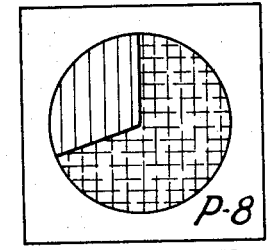
SEC. NO. 7 TURNS AMBER
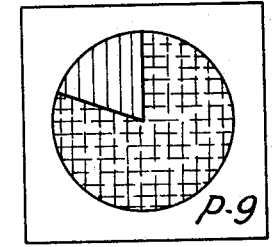
SEC. NO. 8 TURNS AMBER
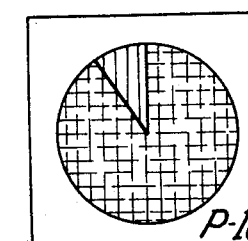
SEC. NO. 9 TURNS AMBER
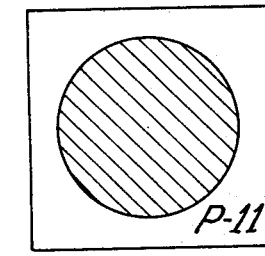
ALL SECTORS TURN GREEN
FIG. 4
INVENTOR.
EDGAR J. SMOOT
BY
Everett Wright
ATTORNEY Sept. 10, 1968      E. J. SMOOT      3,401,372
TRAFFIC CONTROL SIGNALS
Filed Oct. 22, 1965      7 Sheets-Sheet 5
GREEN TO RED SEQUENCE
FACE "C" AND FACE "D"
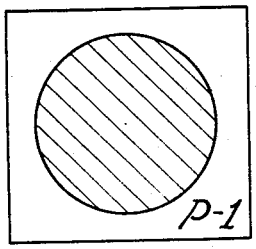
P-1
ALL SECTORS ARE GREEN
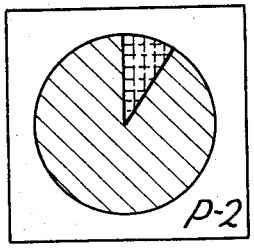
P-2
SEC. NO. 1 TURNS AMBER
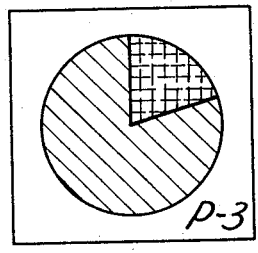
P-3
SEC. NO. 2 TURNS AMBER
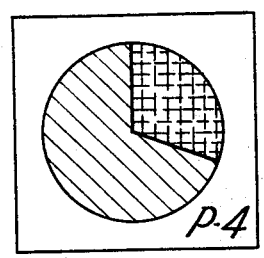
P-4
SEC. NO. 3 TURNS AMBER
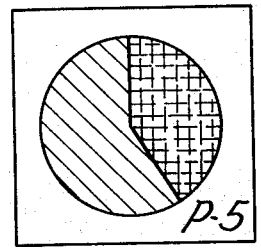
P-5
SEC. NO. 4 TURNS AMBER
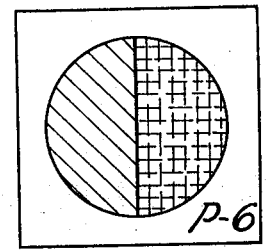
P-6
SEC. NO. 5 TURNS AMBER
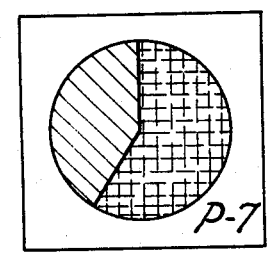
P-7
SEC. NO. 6 TURNS AMBER
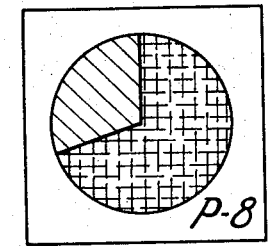
P-8
SEC. NO. 7 TURNS AMBER
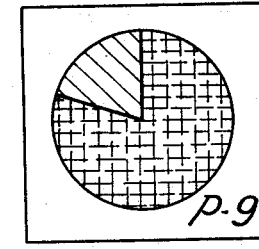
P-9
SEC. NO. 8 TURNS AMBER
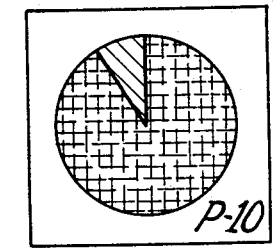
P-10
SEC. NO. 9 TURNS AMBER
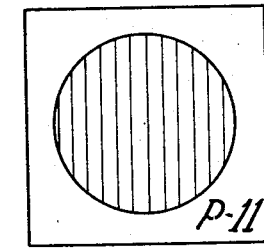
P-11
ALL SECTORS TURN RED
FIG. 5
INVENTOR.
EDGAR J. SMOOT
BY
*Everett G. Wright*
ATTORNEY

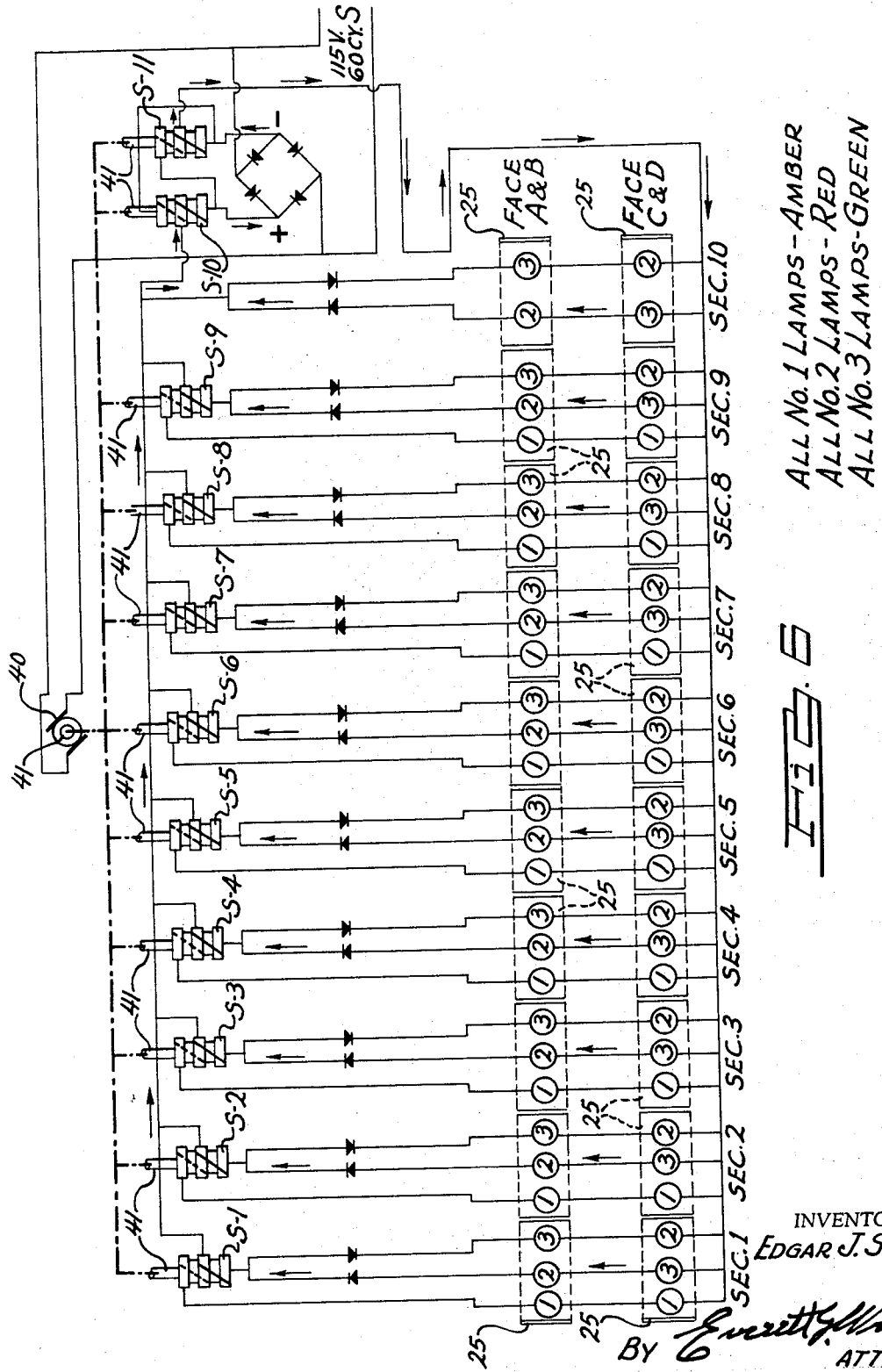

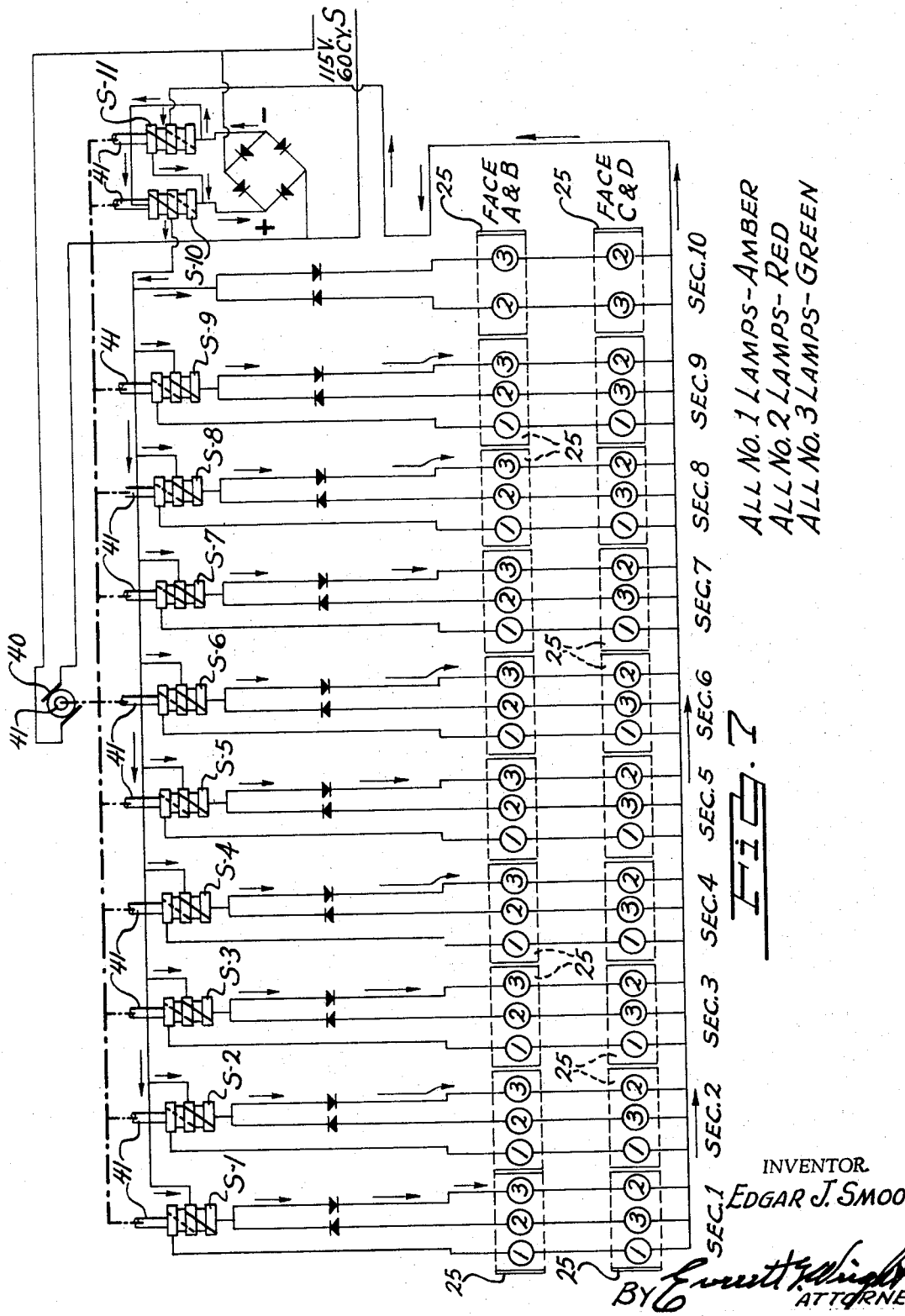

United States Patent Office 3,401,372
Patented Sept. 10, 1968

3,401,372
TRAFFIC CONTROL SIGNALS
Edgar J. Smoot, Dearborn, Mich., assignor of one-half to Robert A. Smoot, Dearborn, Mich.
Filed Oct. 22, 1965, Ser. No. 501,353
3 Claims. (Cl. 340—43)

ABSTRACT OF THE DISCLOSURE

An electrically controlled and illuminated traffic control signal having a plurality of faces for controlling traffic at street intersections, at least one face of which includes a circular shaped signal cluster bowl and means dividing the same into a plurality of sectors, each sector including one Amber light bulb, one Red light bulb and one Green light bulb connected through timing means to a source of electric current illuminating said sectors within the circular bowl at said one face: first all Red, then sequentially slowly changing illumination in each sector beginning at the right of top center from Red to Amber until all but the last sector are Amber, then changing illumination in all sectors to Green, then sequentially slowly changing illumination in each sector beginning at the right of top center from Green to Amber until all sectors but the last are Amber, and then changing all sectors to Red, the said slow changing of illumination in said cluster bowl from Red to Amber or Green to Amber having the effect of gradually wiping out the Red or Green signal respectively by an arcuate sweep of Amber light.

---

This invention relates to traffic control signals of the type employable at street intersections, and in particular to a traffic control signal which precisely and adequately informs the motorist when a change from a Green GO signal to a Red STOP signal and vice versa will occur so that the motorist may be under proper control of his automobile to meet the required demand in the operation thereof to come to an easy gradual stop, or, to start with reasonable dispatch, all to assure a more even flow of traffic with considerably less incidence of accident risks than presently possible with conventional traffic control signals.

Accordingly, the primary object of the instant invention is to provide an improved traffic control signal which informs the motorist of the impending change from a conventional Green GO light to a conventional Red STOP light so that the motorist may more accurately contemplate stopping and actually stop when the Red STOP light is presented to him whereby to avoid intersection accidents caused by accidental "running of the Red STOP light," and, to inform the motorist of the impending change from a conventional Red STOP light to a conventional Green GO light so that the motorist may start his vehicle without undue delay when the Green GO light is presented to him whereby to substantially increase the number of vehicles that may cross a given intersection on a Green GO light of a specific duration.

A further object of the instant invention is to provide an electrically controlled and illuminated traffic control signal having oppositely facing angularly related pairs of signals, each signal consisting of a circular signal cluster divided into a plurality of sectors, each sector including one Amber light bulb, one Red light bulb and one Green light bulb, and timing means applying electric current alternately to all Red light bulbs of one opposite pair of signals and to all Green light bulbs of the said angularly related opposite pair of signals, then sequentially applying current to the Amber light bulb in each sector of both pairs of signals beginning at the right of top center of each circular signal cluster while simultaneously releasing current from the lighted Red or Green light bulb in each said sector, and then applying current to all Green and Red light bulbs in said angularly related pairs of circular signal clusters after all of the Amber light bulbs, or all but one of said Amber light bulbs, in each circular cluster have been sequentially lighted and current is released therefrom, whereupon the same cycle of operation is initiated with current applied to all Green light bulbs in said one opposite pair of signals and to all Red light bulbs of the said angularly related opposite pair of signals.

A further object of the instant invention is to provide an electrically controlled and illuminated traffic control signal having a plurality of faces for controlling traffic at street intersections, at least one face of which includes a circular shaped signal cluster bowl and means dividing the same into a plurality of sectors, each sector including one Amber light bulb, one Red light bulb and one Green light bulb connected through timing means to a source of electric current illuminating said sectors within the circular disc at said one face: first all Red, then sequentially slowly changing illumination in each sector beginning at the right of top center from Red to Amber until all but the last sector are Amber, then changing illumination in all sectors to Green, then sequentially slowly changing illumination in each sector beginning at the right of top center from Green to Amber until all sectors but the last are Amber, and then changing all sectors to Red, the said slow changing of illumination in said cluster bowl from Red to Amber or Green to Amber having the effect of gradually wiping out the Red or Green signal respectively by an arcuate sweep of Amber light.

Still another object of the invention is to provide a traffic control signal in which the lights of each face are arranged in a plurality of sectors, each sector having therein one Amber light bulb, one Red light bulb and one Green light bulb so that when a light bulb in any sector "burns out," particularly the Red or Green light bulb thereof, the other Red or Green light bulbs of other sectors continue the Red or Green illumination as the case may be, and the traffic control function of traffic control signals of the invention continues substantially unimpaired. This is in contradistinction to present conventional traffic signals which have the distinct disadvantage that whenever any of the signal light bulbs burn out, particularly the Red or Green bulbs thereof or the White bulb behind the Red or Green lenses thereof, both motorists and pedestrians become confused causing increased accident hazards and traffic jams.

Other objects of the invention will become obvious by reference to the following detailed description taken in connection with the accompanying drawings, in which:

FIG. 4 is a diagrammatic view showing a Red to Green sequence of Faces A and B.

FIG. 5 is a diagrammatic view showing a Green to Red sequence of Faces C and D occurring simultaneously with the Red to Green sequence of Faces A and B illustrated in FIG. 4.

FIG. 6 is a wiring diagram of a preferred timer circuit employed to accomplish the desired gradual changing of Red to Green illumination sequence in Faces A and B with intervening progressively clockwise sectoral changes of said Red illumination to Amber until all but one Red sector on said Faces A and B have changed to Amber, whereupon the illumination in the Faces A and B change to fully Green.

Figure 1:
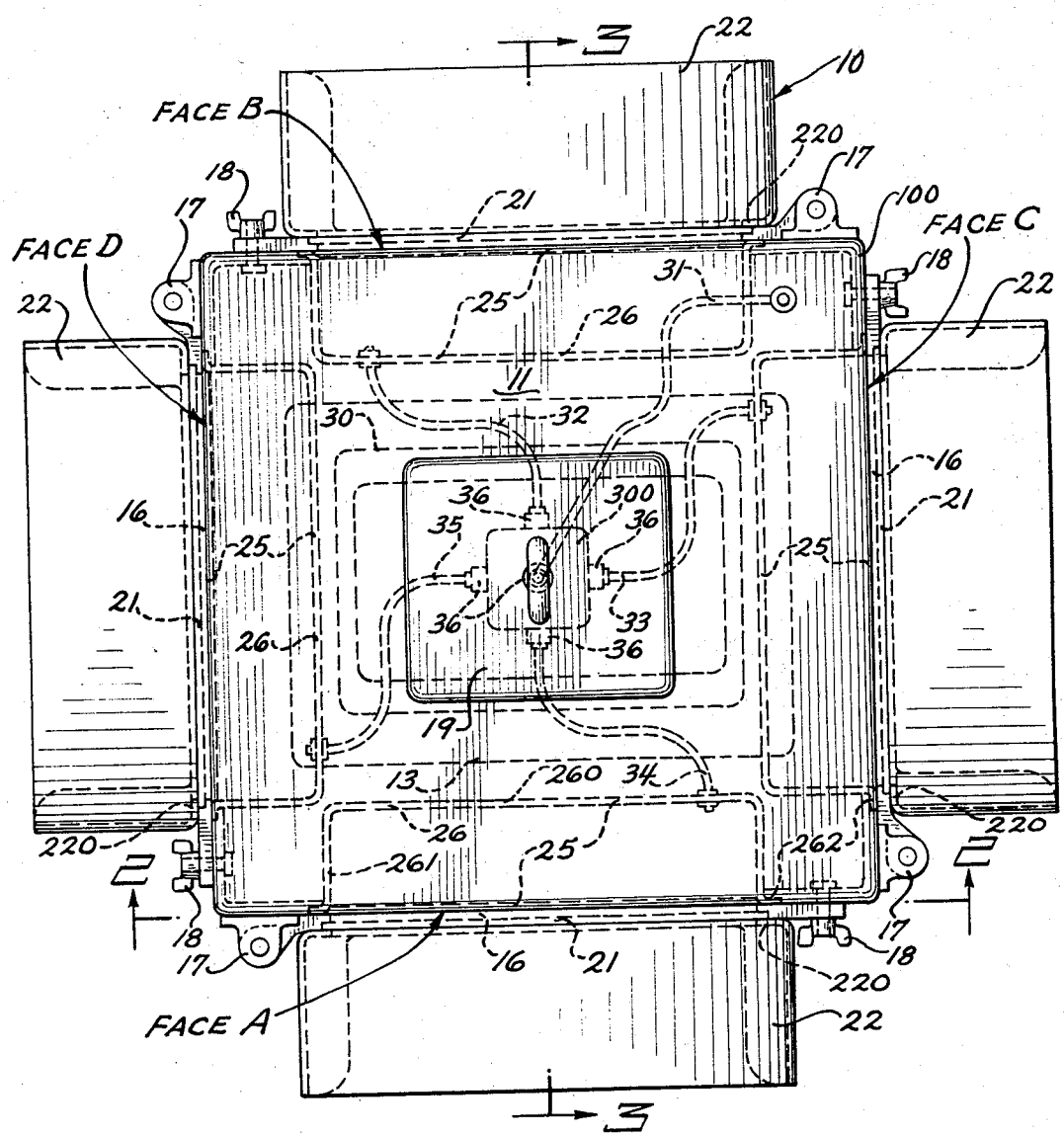
FIG. 1 is a top plan view of a traffic control signal illustrating the invention, the said traffic control signal being of a type employable at a conventional 180 degree street intersection.

FIG. 7 is a wiring diagram of the said preferred timer circuit similar to FIG. 6 except that it is conditioned to accomplish the desired gradual changing of Green to Red illumination sequence in Faces C and D with intervening progressive clockwise sectoral changes of said Green illumination to Amber until all but one Green sectors on said Faces C and D have changed to Amber, whereupon the illumination in the Faces C and D change to fully Red.

Referring now to the drawings wherein like reference characters refer to like and corresponding parts throughout the several views, the particular embodiment of the invention disclosed therein for illustrative purposes is a four faced traffic control signal 10 of a type employable at a typical 180 degree street intersection. It is understood that traffic control signals of the invention also may be constructed in a like and similar manner with one or more faces angularly related as required to control the flow of traffic along a street or highway or at the intersection or meeting of two or more streets or highways having other than 180 degree relationships with respect to each other.

The housing 100 of the traffic control signal 10 preferably consists of a top 11, a bottom 12 having a rectangular access hatch 13 therein fixed thereto by suitable studs 14, and four sides 15 each having an access door 16 hinged thereto by suitable hinges 17 and securable in its closed position by anchorage elements 18. The top 11 and bottom 12 of the housing 100 are preferably provided with vent apertures 110 and 120 respectively therein. At the center of the said top 11 is a hood 19 with vent apertures 190 at the sides thereof covered by a spaced overhang 191 which prevents entry of rain and dirt into the housing 100 while permitting warm air to escape therefrom. Extending upwardly from the central portion of the said hood 19 is a suitable anchorage eye 192 by means of which the traffic control signal 10 may be hung from a supporting arm or cable, not shown.

Figure 2:
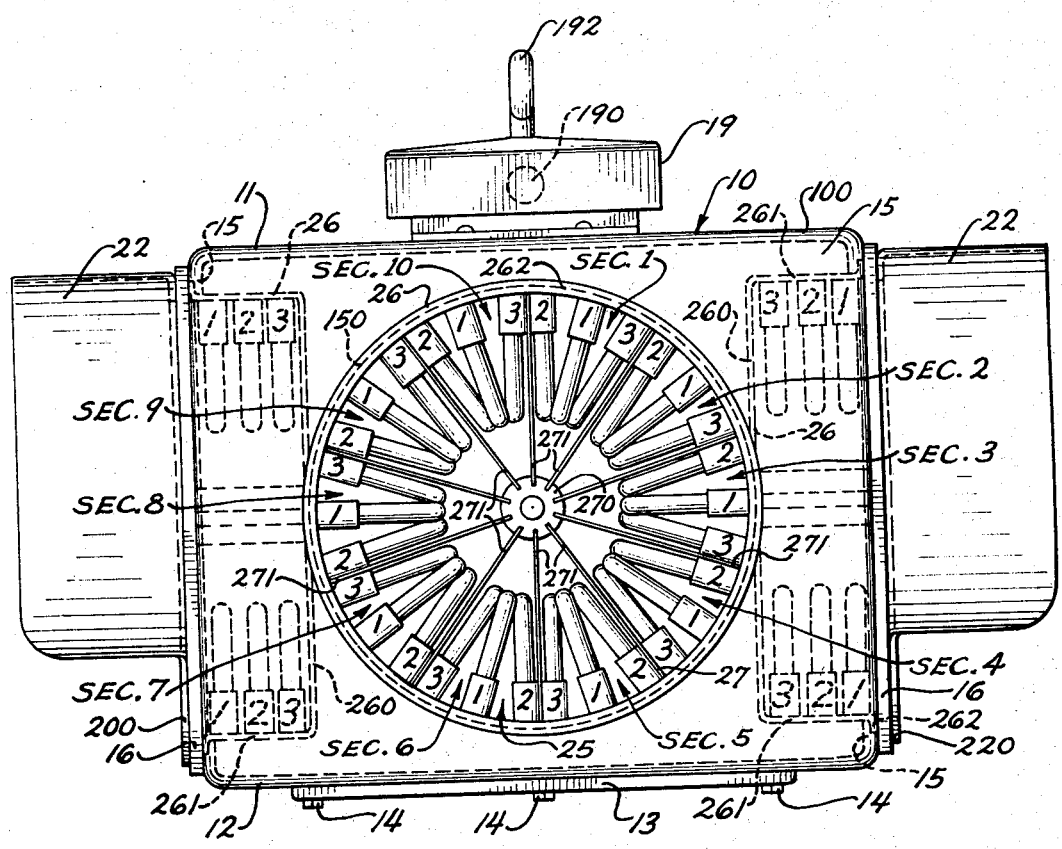
FIG. 2 is a side elevational view taken on the line 2—2 of FIG. 1 with the access door and door hardware removed.
Figure 3:
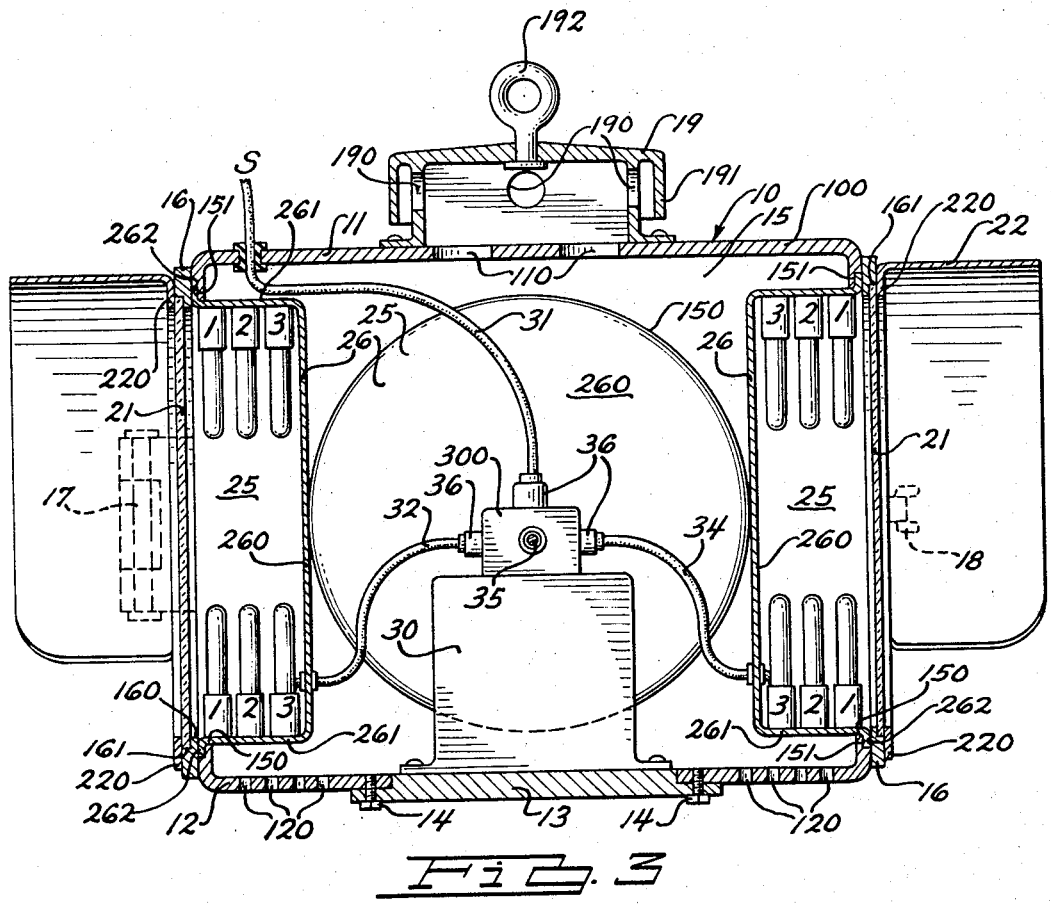
FIG. 3 is a transverse sectional view taken on the line 3—3 of FIG. 1.

Each side 15 of the housing 100 is circularly apertured at 150, and is annularly notched at 151 around said aperture 15 to accommodate a circular signal cluster 25 as best shown in FIGS. 2 and 3. Each access door 16 has a circular aperture 160 therein substantially the same size as the circular signal cluster housing 26, and is annularly notched at 161 therearound to accommodate a circular glass or plastic lens 21 preferably fixed therein by the annular base flange 220 of a hood element 22 removably secured by suitable means (not shown) to the outside face of each access door 16. The said hood elements 22 are so formed as to limit visibility of signal lights eminating from the lenses 21 of the traffic control signal 10 to the desired angle of view of motorists and pedestrians according to the particular placement of the said traffic control signal 10.

Each signal cluster 25 preferably comprises a circular pan shaped housing 26 having a bottom 260, a circular wall 261 and an outwardly disposed annular flange 262. The said annular flange 262 of each signal cluster housing 26 fits in the annular notch 151 formed in a side 15 of the traffic control signal housing 100 around the circular aperture 150 therein, and is secured thereto by suitable means, not shown. The dished portion of the pan shaped signal cluster housing 26 is divided by a spider 27 into a plurality of sectors, for example 10. The said spider 27 preferably has a central hub 270 and ten equally spaced radially disposed partitions 271 forming the ten sectors which are numbered Sec. 1 through Sec. 10 inclusive. One of the said partitions 271 is preferably radially disposed vertically at a 12 o'clock position from the said central hub 270, and, as viewed in FIG. 2, Sec. 1 and Sec. 10 are disposed clockwise and counterclockwise respectively from said 12 o'clock position. Each of Sec. 1 through Sec. 9 inclusive of the housing 26 of each signal cluster 25 has therein three electric light sockets numbered 1, 2 and 3 having therein Amber, Red and Green electric lamps or light bulbs respectively; however, Sec. 10 has only two electric light sockets numbered 2 and 3 having therein Red and Green light bulbs. In other words, No. 1 lights are Amber when illuminated, No. 2 lights are Red when illuminated, and No. 3 lights are Green when illuminated. The intensity of illumination from each Amber, Red or Green electric lamp or light bulb in each sector is sufficient to fully illuminate said sector either Amber, Red or Green respectively when electric current is applied to any one of said light bulbs through a suitable timer 30.

Electric current is applied to each of the several lamps or light bulbs of each of the several signal clusters 25 from a source of electric current S through a main cable 31 to the timer 30, and from the timer 30 through distribution cables 32, 33, 34 and 35 to signal clusters 25 at Faces A, B, C and D respectively. Suitable connectors 36 of a quick connect-disconnect type are preferably employed to connect the said main and distribution cables to a timer junction box 300 positioned on top of the timer 30. This permits the timer 30 to be replaced readily for maintenance whenever required. The traffic control signal 10 disclosed herein to illustrate the invention may be operated by any suitable timer 30 such as shown in FIGS. 6 and 7, the timer mechanism shown being of a motor-cam actuated micro switch type; however, it is to be understood that other timer mechanisms may be employed to accomplish the particular light sequences desired at any installation of traffic control signals embodying the invention. Obviously, the timer 30 may be incorporated in the traffic signal housing 100 as shown in the drawings, or, it may be housed in a signal box remote therefrom.

Referring now to FIGS. 6 and 7, a typical timer mechanism 30 of one type employable in traffic control signals of the invention is shown diagrammatically therein. It is obvious that other timer mechanisms may be employed to accomplish electric control of sequential illumination of the lights or bulbs 1, 2 and 3 in each of the preferably ten sectors of the signal cluster 25 of each angularly related pair or other arrangement of signal faces of traffic control signals embodying the invention, and that the traffic control signals of the invention may be suitably arranged to control traffic along a highway and at intersections or meetings of one or more highways or streets.

In the illustrative embodiment of a traffic control signal 10 of the invention disclosed herein, the timer 30 may consist, for example, of a 1 r.p.m., 3 watt, 100 volt A.C. synchronous motor 40 having a shaft 41 on which is mounted a plurality of cams (not shown) of conventional cam-roller operated type switches S–1 through S–11 inclusive. In FIG. 6, the said switches are positioned to illuminate all Red lights 2 in Faces A & B and all Green lights 3 in Faces C & D. In FIG. 7, the said switches are all positioned to illuminate all Green lights 3 in Faces A & B and all Red lights 2 in Faces C & D. The direction of flow of current in each of FIGS. 6 and 7 is indicated by full line arrows therein, which current flow direction is preferably maintained by the diodes illustrated by blackened triangles therein and switches S–10 and S–11.

The cams of the cam-roller operated switches S–1 through S–11 inclusive are formed in a conventional manner to provide the desired signal operation. In the particular illustrative example given, Face A is opposite Face B and the signals thereof function alike; that is, Face A and Face B signals turn Red to Green simultaneously. Also, Face C is opposite Face D and the signals thereof likewise function alike, but out of phase with Faces A and B so that when Faces A and B are Red or Green, Faces C and D are Green or Red respectively.

When any Face A, B, C or D is illuminated Red or Green for a certain period of time, say thirty seconds, then the Red or Green lights respectively in Sectors 1 through 9 inclusive of the signal cluster in each said Face A, B, C and D are extinguished sequentially at timed intervals, say three seconds, while the Amber light in each of said Sectors 1 through 9 inclusive of each cluster 25 are sequentially illuminated at said three second intervals and remain illuminated until all of Sectors 1–9 inclusive show Amber, then, after the Amber light of Sector 9 has been illuminated for three seconds, all lights in Sectors 1–10 inclusive of each signal cluster 25 of Faces A and B becomes Green, and all lights in Sectors 1–10 inclusive of each signal cluster 25 of Faces C and D become Red.

FIGS. 4 and 5 illustrate respectively the Red to Green and the Green to Red sequences of illumination for Faces A & B and C & D disclosing illumination positions P–1 through P–11 inclusive in each of said FIGS. 4 and 5 showing the gradual change or sweep of illumination from full Red to full Green or vice versa, which gradual change includes a sequential extinguishing at timed intervals of sectors of the Red or Green illumination of Faces A & B and C & D, and substituting therefor an Amber light for the extinguished Red or Green lights sweeping clockwise from a 12 o'clock position sequentially through Sectors 1–9 inclusive, after which, and at a timed interval, say three seconds, all Sectors 1–10 inclusive which, at the beginning of the Red to Green sequence and the Green to Red sequence were full Red and full Green respectively, become illuminated full Green and full Red as the case may be.

Referring again to FIG. 6, the timer mechanism 30 has all of its cam-roller type switches S–1 through S–11 closed as indicated by the full lines diagonally thereacross, and, as so conditioned, current from the source S flows in the direction indicated by the arrows illuminating all Red lamps or lights 2 and all Green lamps or lights 3 in each of Secs. 1–10 inclusive. With the timer motor 40 running, the motor shaft 41 turns a cam (not shown) in each cam-roller type switch S–1 through S–11 to sequentially throw said switches S–1 through S–11 at timed intervals, say three seconds, to accomplish the lighting sequence of signal Faces A & B and C & D as hereinabove described and as illustrated in FIGS. 4 and 5.

In other words, with all of the switches S–1 through S–11 closed as indicated by the full lines in FIG. 6, current is applied to the Red lamps or lights 2 in all Secs. 1–10 inclusive of Faces A & B and to the Green lamps or lights 3 in all Secs. 1–10 inclusive of Faces C & D. As the synchronous motor 40 turns its shaft 41, the contacts of each switch S–1 through S–11 sequentially change at given intervals from their full line position as indicated in FIG. 6 to the dotted line position therein which accomplishes the desired lighting sequences of signal Faces A & B and C & D.

It will be noted by reference to FIG. 6 that after Sec. 9 turns Amber and an interval of time elapses, say three seconds, switch 10 illuminates all lamps or lights in Faces A & B Green and all lamps or lights in Faces C & D Red, while switch 11 reverses the current flow in the circuit as shown in FIG. 7, whereupon the Red to Green sequence of Faces A & B and the Green to Red sequence of Faces C & D now begin to occur in Faces C & D and Faces A & B respectively, thus returning the Faces C & D and Faces A & B to their condition previously described for Faces A & B and C & D respectively at the initiation shown in FIG. 6 of one complete cycle of operation of a signal light illustrating the invention.

The timing of the illumination of the several sectors of any one traffic control signal face may be regulated by the particular selection and relative arrangement of cams in the timer-switch means so that any desired dwell of Red, Amber or Green illumination may be had in the signal sequence of any signal sector and/or face, and, it is obvious that all signal faces need not be necessarily timed alike whereby to suitably control the movement of traffic from opposite or angularly related directions.

As hereinbefore pointed out, traffic control signals of the invention may be modified from the typical 4-Way intersection traffic control signal herein disclosed in detail to use traffic control signals of the invention along highways, at oddly angled meeting of streets and highways, and elsewhere when and as required, and it is obvious that many changes may be made in the size, shape, arrangement and details of the invention to accomplish its use at other than the typical 4-Way intersections, all without departing from the spirit and scope of the instant invention as defined by the appended claims.

I claim:

1. An electrically controlled and illuminated traffic control signal including a housing having one or more illuminable traffic control faces, at least one of said faces comprising:
   a circular pan shaped signal cluster bowl and means dividing said bowl into a plurality of sectors radiating from the center thereof,
   one Amber, one Red and one Green light bulb in each said sector except one sector having only one Red and one Green light bulb therein,
   timer-switch means controlling the illumination of at least one of said illuminable traffic control faces,
   said timer-switch means being connected to a source of electric current applying said electric current first to the Red light bulb in all sectors illuminating said one face all Red.
   said timer-switch means sequentially disconnecting current supply at timed intervals from the Red bulb in each sector of said one face clockwise as said one face is viewed except the Red bulb in said one sector and applying current substantially simultaneously to the Amber light bulb in each sector except said one sector as said current is disconnected from each said Red bulb whereby to change illumination with a visual sweeping effect in said one face from Red to Amber except in said one sector which remains Red,
   said timer-switch means then disconnecting current supply from said Amber light bulbs and the Red bulb remaining lighted in said one sector simultaneously at a timed interval after all said Amber light bulbs have been lighted, and then applying current to the Green light bulbs in all sectors illuminating said one face all Green,
   said timer-switch means sequentially disconnecting current supply at timed intervals from the Green bulb in each sector of said one face clockwise as said one face is viewed except the Green bulb in said one sector, and applying current substantially simultaneously to the Amber light bulb in each sector except said one sector as said current is disconnected from each said Green bulb whereby to change illumination with a visual sweeping effect in said one face from Green to Amber except in said one sector which remains Green,
   said timer-switch means then disconnecting current supply from said Amber light bulbs and the Green bulb remaining lighted in said one sector simultaneously at a timed interval after all said Amber light bulbs have been lighted and then applying current to all said Red light bulbs in all sectors again illuminating said one face all Red.

2. An electrically controlled and illuminated traffic control signal including a housing having one or more illuminable traffic control faces, at least one of said faces comprising:
   a circular pan shaped signal cluster bowl and means dividing said bowl into a plurality of sectors radiating from the center thereof,
   one Amber, one Red and one Green light bulb in each said sector,
   timer-switch means including synchronous motor driven cams controlling the illumination of at least one of said illuminable traffic control faces, said timer-switch means being connected to a source of electric current connecting said electric current first to the Red light bulb in all sectors illuminating said one face all Red, said timer-switch means then sequentially disconnecting current supply at timed intervals from the Red bulb in each sector of said one face clockwise as said one face is viewed, and applying current substantially simultaneously to the Amber light bulb in each sector as said current is disconnected from each said Red bulb whereby to change illumination with a visual sweeping effect in said one face from Red to Amber, said timer-switch means then disconnecting current supply from said Amber light bulbs at a timed interval after all said Amber light bulbs have been lighted and then applying current to the Green light bulbs in all sectors illuminating said one face all Green, said timer-switch means sequentially disconnecting current supply at timed intervals from the Green bulb in each sector of said one face clockwise as said one face is viewed, and applying current substantially simultaneously to the Amber light bulb in each sector as said current is disconnected from each said Green bulb whereby to change illumination with a visual sweeping effect in said one face from Green to Amber, said timer-switch means then disconnecting current supply from said Amber light bulbs at a timed interval after all said Amber light bulbs have been lighted and then applying current to all said Red light bulbs in all sectors again illuminating said one face all Red.

3. An electrically controlled and illuminated traffic control signal including a housing having one or more illuminable traffic control faces, at least one of said faces comprising:

a circular shaped signal cluster bowl and means dividing said one bowl into a plurality of sectors radiating from the center thereof, one Amber, one Red and one Green light bulb in each said sector, timer-switch means including synchronous motor driven cam operated switches connected to a source of electric current supplying current to each Amber, Red and Green light bulb in each said sector of said one face, said timer-switch means connecting said Amber, Red and Green light bulbs to said source of current and thereby illuminating the same in substantially the following sequence:

(a) first, simultaneously connecting the Red bulbs in all sectors illuminating said one face Red, (b) second, disconnecting each Red bulb of each sector sequentially beginning at the right of 12 o'clock when viewing the sectors of the one said face, and substantially simultaneously connecting the Amber bulb of each said sector.

(c) third, disconnecting said Amber bulbs at a timed interval after all said Amber bulbs have been lighted, and substantially simultaneously connecting current to all Green bulbs illuminating said one face Green, (d) fourth, disconnecting each Green bulb of each sector sequentially beginning at the right of 12 o'clock when viewing the sectors of the one said face, and substantially simultaneously connecting the Amber bulb of each said sector, (e) fifth, disconnecting current supply from said Amber bulbs at a timed interval after all said Amber bulbs have been lighted, and substantially simultaneously connecting current to all Red light bulbs again illuminating said one face Red.

No references cited.

THOMAS B. HABECKER, *Primary Examiner.*